A. E. Cruttenden.
Plow.

No. 86,370. Patented Feb. 2, 1869.

Witnesses.
C. Raettig
Wm. A. Morgan

Inventor
A. E. Cruttenden p. Munn & Co.
Attorneys

A. E. CRUTTENDEN, OF CANASARAGA, NEW YORK.

Letters Patent No. 86,370, dated February 2, 1869.

IMPROVEMENT IN PLOW-ATTACHMENT.

The Schedule referred to in these Letters Patent and making part of the same.

*To all whom it may concern:*

Be it known that I, A. E. CRUTTENDEN, of Canasaraga, in the county of Allegany, and State of New York, have invented a new and useful Improvement in Plow-Attachment; and I do hereby declare that the following is a full, clear, and exact description thereof, which will enable others skilled in the art to make and use the same, reference being had to the accompanying drawings, forming part of this specification.

This invention relates to improvements in plowing-apparatus; and consists of an adjustable attachment, to be applied to the beams of common plows, for guiding them, regulating their depth of cutting, and for governing the plane of the plows when working on side-hills.

Figure 1:
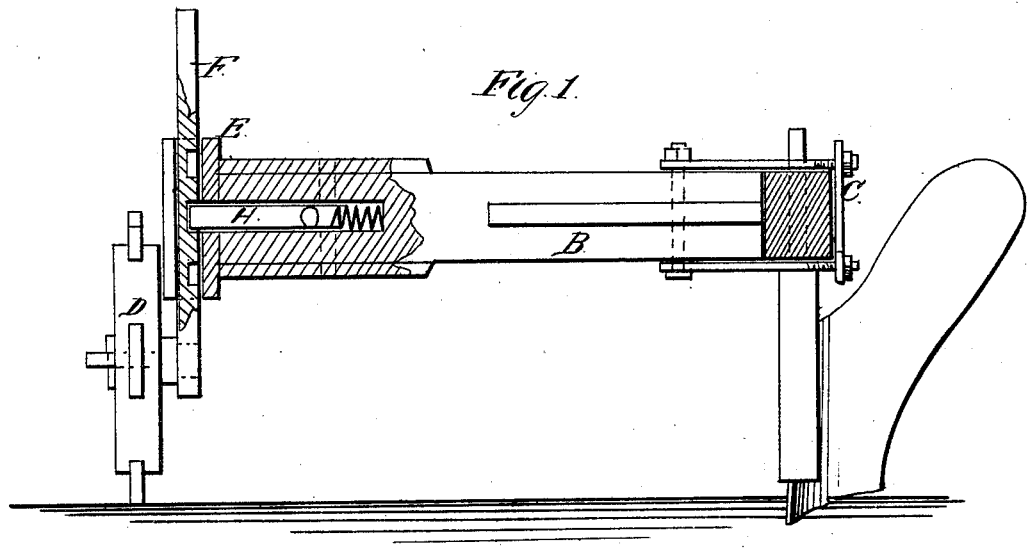
Figure 2:
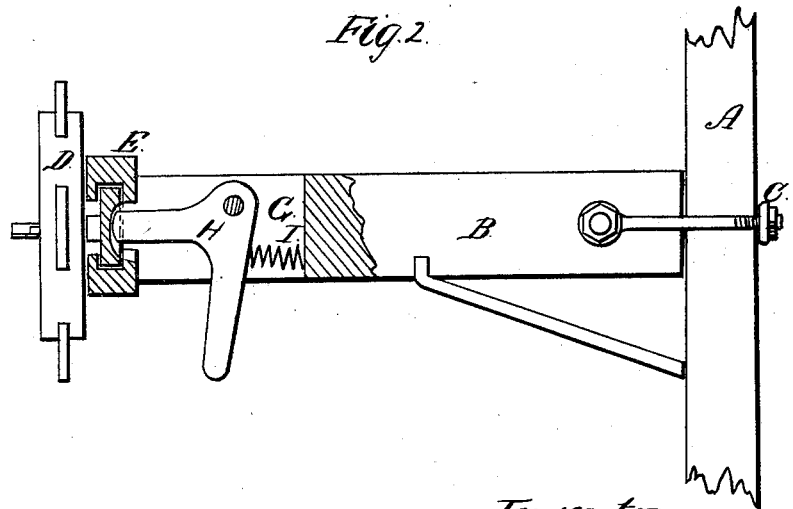

Figure 1, in the drawing, represents a front elevation of my improved attachment, partly broken away, and Figure 2 represents a plane view of the same, also partly broken away.

Similar letters of reference indicate corresponding parts.

A represents the plow-beam, to which I propose to attach a short arm, B, at right angles thereto, by a clamping-device, C.

Upon the outer end of the said arm B, I propose to arrange a guiding-wheel, D, in an adjustable manner, so that it may be adjusted to vary the height of the arm, and, consequently, the end of the beam from the ground, the wheel D being arranged to run on the ground.

The end of the beam is provided with a vertical guide-way, E, and a vertical slide, F, arranged to work up and down therein, to the lower end of which the wheel D is journalled.

Within a horizontal slot, G, in the end of the beam, opening at one end into the space of the vertical guide-way, is arranged a bell-crank, H, upon a pivot, and with a spring, I, which has a constant tendency to force one end of the bell-crank out into notches in the vertical slide F, when the said notches are opposite the end of the lever.

The said bell-crank H may be withdrawn from the said notches for adjusting the slide F, by pressing the former backward against the spring.

The wheel, being provided with lugs, which are pressed into the ground by the downward tendency of the draught on the end of the plow-beam, affords a means for guiding the plow, and taking the labor, to a great extent, off from the plowman.

It also serves to govern the plane of the plow in working upon side-hills, to maintain it more uniformly vertical, and also the depth of cutting.

Having thus described my invention,

I claim as new, and desire to secure by Letters Patent—

1. The arm B, supporting the guiding-wheel D adjustably, and attached to the plow-beam, in the manner described.

2. The combination, with the arm B, of the vertical slide F, supporting the guiding-wheel and the spring-actuated bell-crank, all substantially as and for the purpose specified.

The above specification of my invention signed by me, this 3d day of December, 1868.

A. E. CRUTTENDEN.

Witnesses:
FRANK BLOCKLEY,
ALEX. F. ROBERTS.